(12) United States Patent
Thiele et al.

(10) Patent No.: US 6,550,497 B2
(45) Date of Patent: Apr. 22, 2003

(54) MULTIPATH ROTARY DISC VALVE FOR DISTRIBUTING POLYMER PLASTICS MELTS

(75) Inventors: Ulrich K. Thiele, Bruchköbel (DE); Detlef Gneuss, Bad Oeynhausen (DE)

(73) Assignee: Gneuss Kunststofftechnik GmbH, Bad Oeynhausen (DE)

( * ) Notice: Subject to any disclaimer, the term of this patent is extended or adjusted under 35 U.S.C. 154(b) by 0 days.

(21) Appl. No.: 09/885,396

(22) Filed: Jun. 20, 2001

(65) Prior Publication Data

US 2002/0124895 A1 Sep. 12, 2002

(30) Foreign Application Priority Data

Jun. 21, 2000 (DE) .......................................... 100 30 584

(51) Int. Cl.[7] ............................................. F16K 11/074
(52) U.S. Cl. ................................................. 137/625.46
(58) Field of Search ....................... 137/625.45, 625.46, 137/625.47

(56) References Cited

U.S. PATENT DOCUMENTS

| | | | | |
|---|---|---|---|---|
| 917,970 A | * | 4/1909 | Smith et al. ............ | 137/625.46 |
| 2,567,428 A | * | 9/1951 | Greeley ................ | 137/625.46 |
| 2,878,829 A | * | 3/1959 | Folmsbee ............... | 137/625.46 |
| 3,892,259 A | * | 7/1975 | McClocklin ............ | 137/625.21 |
| 4,224,958 A | * | 9/1980 | Kaplan et al. ........... | 137/340 |
| 4,294,285 A | * | 10/1981 | Joslyn ................ | 137/625.11 |
| 4,705,073 A | * | 11/1987 | Beck .................. | 137/625.45 |
| 4,827,980 A | * | 5/1989 | Mazzei et al. ......... | 137/625.46 |
| 5,211,845 A | | 5/1993 | Kaneshige | |
| 5,419,419 A | * | 5/1995 | Macpherson ........... | 192/87.13 |
| 5,516,426 A | * | 5/1996 | Hull et al. ............ | 210/256 |
| 5,928,523 A | | 7/1999 | Hobrecht et al. | |
| 6,012,487 A | * | 1/2000 | Hauck ................ | 137/625.11 |
| 6,135,152 A | * | 10/2000 | Knapp ................ | 137/625.41 |
| 6,394,127 B1 | * | 5/2002 | Creswell et al. ....... | 137/625.46 |

FOREIGN PATENT DOCUMENTS

EP 0962299 12/1999

* cited by examiner

*Primary Examiner*—John Fox
(74) *Attorney, Agent, or Firm*—Friedrich Kueffner

(57) ABSTRACT

A multipath valve for distributing and/or dividing at least one flow of polymer melt during the manufacture and processing thereof, wherein melt flows through all internal chambers of the valve during all conditions of operation. At least one rotary disc is rotatably mounted on an axle bolt between a front plate and a rear plate which are each provided with openings serving as inlets and outlets for the polymer melt. The rotary disc is provided with circular segment-shaped ducts having a width and end radii corresponding to an inner width of the openings, wherein the ducts have center lines which are located on a reference circle extending through the centers of the openings, and wherein the positions of the ducts are adjustable in accordance with a desired flow direction of the polymer melt.

10 Claims, 5 Drawing Sheets

MULTIPATH ROTARY DISC VALVE FOR DISTRIBUTING POLYMER PLASTICS MELTS

BACKGROUND OF THE INVENTION

1. Field of the Invention

The present invention relates to a multipath rotary disc valve for distributing polymer plastics melts of high molecular weight.

2. Description of the Related Art

In the manufacture and processing of polymers, for achieving a flexible process it is frequently necessary to selectively distribute melt flows to different processing stages.

The distribution of melt flows of plastics having higher viscosities, for example, the distribution of polymer melts of high molecular weight, from a principal line to different distributor lines still causes technical problems today. For solving these problems, multipath valves are usually proposed in which the respective flow direction is opened or closed by pistons. For example, U.S. Pat. No. 5,211,845 describes a polymer valve in which the closing pistons are arranged in a V-shaped configuration in order to keep the dead space occurring during the exchange of the flow direction as low as possible. In connection with the alternating flow into different filter chambers, U.S. Pat. No. 5,928,523 proposes a valve construction in which three valve chambers are used which must be emptied and rinsed each time the initial positions are changed.

EP-0 962 299 A1 describes a multipath plug-type valve in which the drive is located outside of the heating unit.

These commercially available valves, such as multipath piston valves or plug-type valves, have the disadvantage that the spaces between contact surfaces and the valve chamber itself contains residues of the melt when a flow direction is closed off, wherein these residues are thermally decomposed when remaining for a long period of time at process temperature, so that carbonized decomposed products reach the polymer melt when the flow direction is used once again. In addition, sealing of the valves in piston valves can be effected only through fitted seats which are adjusted during the manufacturing process and by forcing in the plug in the case of plug-type valves. Polymer residues are also deposited in the fitted seats of piston valves, wherein these polymer residues are decomposed and reach the flow of melt when the melt is moved. Plug-type valves have the tendency to be tight to operate because of the contact pressure between surfaces which is difficult to control.

SUMMARY OF THE INVENTION

Therefore, it is the primary object of the present invention to provide a multipath valve which is free of dead space to be used for distributing melt flows in the manufacture or processing primarily of thermoplastic polymers, wherein the valve makes it possible to conduct the melt in a circulation line, directly to the output or through a casting nozzle, or which makes it possible to optionally separate or connect the valve to different melt circulations without producing melt residues.

To be able to carry out such operations as they are frequently desired in the discontinuous manufacturing processes of polymers, without the usual disadvantages of deposited, thermally decomposed melt residues in the valve chambers or in the fits required necessarily for the mobility of the closing elements, the present invention proposes a multipath valve in which the melt flows through the interior of the valve in all conditions of operation, so that the formation of melt residues is always prevented.

The various features of novelty which characterize the invention are pointed out with particularity in the claims annexed to and forming a part of the disclosure. For a better understanding of the invention, its operating advantages, specific objects attained by its use, reference should be had to the descriptive matter in which there are described preferred embodiments of the invention.

DESCRIPTION OF THE PREFERRED EMBODIMENTS

Figure 1:
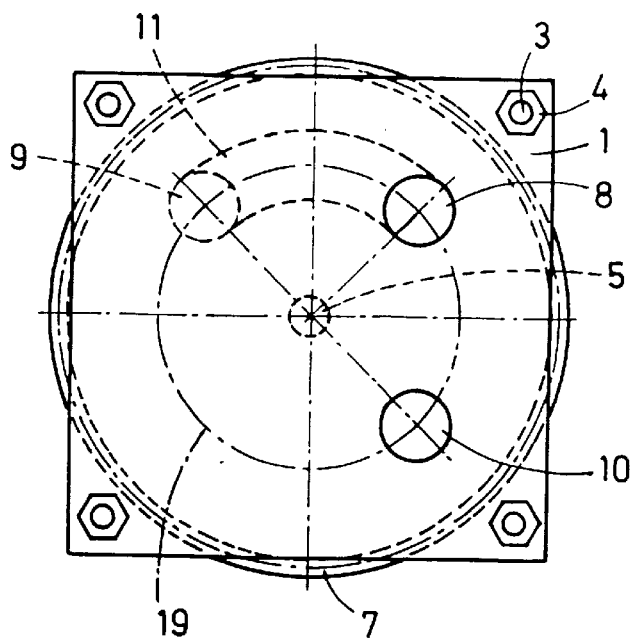
FIG. 1 is an elevational view of a three-way valve according to a first embodiment of the invention with a rotary disc, shown in a position for feeding an outlet.

FIGS. 1 through 4 of the drawing show a three-way valve with a rotary disc which in a first position thereof opens the flow path of the melt from an inlet opening to a first outlet opening. After changing the position of the rotary valve, this flow path is closed and the flow path from the inlet opening to a second outlet opening is opened. Valves of this type can be used, for example, for discharging a melt and for granulation; they can be used in connection with exchangeable filters and make it possible to remove samples a desired.

Figure 2:
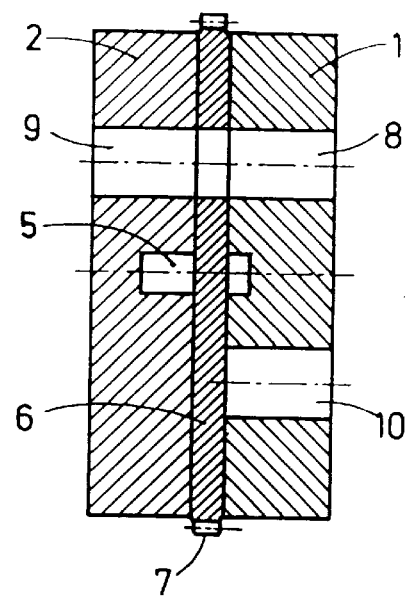
FIG. 2 is a special sectional view of the valve of FIG. 1.
Figure 3:
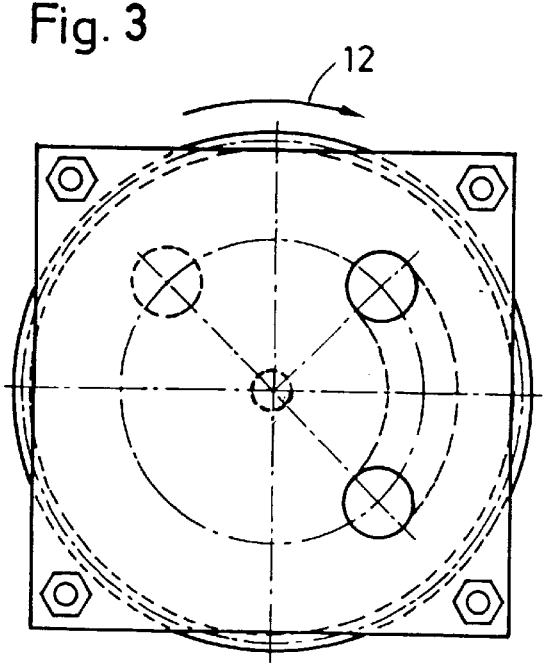
FIG. 3 is an elevational view of the valve of FIGS. 1 and 2, shown after switching to a position for feeding the outlet.

FIGS. 1 and 2 show a front plate 1 of a valve housing which is clampingly connected to the rear plate 2 of the housing by means of clamping bolts 3 and nuts 4. As shown in FIGS. 1 and 2, the rear plate 2 is equipped with an axle bolt 5 which concentrically supports a rotary disc 6 mounted between the front plate and the rear plate. The circumference of the rotary disc 6 is provided with a toothed rim 7 which makes it possible to adjust the rotary disc by means of a pinion of a drive unit, not shown in the drawing, which engages in the toothed rim 7.

The front plate 1 is provided with an inlet opening 8 for the polymer melt and the front plate 1 and the rear plate 2 each have an outlet opening, wherein the angle distance between the first outlet opening 9 and the inlet opening 8 is equal to the angle distance between the second outlet opening 10 and the inlet opening 8.

The rotary disc 6 contains a melt duct 11 which has the shape of a segment of a circle and whose center line extends along a reference circle 19 which includes the center points of the inlet opening 8 and of the outlet openings 9 and 10, wherein the length of the melt duct 11 corresponds to the distance between the inlet and outlet openings 8, 9 and 10, and wherein the ends of the melt duct 11 are rounded off with a radius equal to the radius of the inlet and outlet openings 8, 9 and 10.

For sealing the housing, the inner surfaces of the front plate 1 as well as of the rear plate 2 are carefully ground, hardened and, if necessary, surface-treated, as is the case in the rotary slide 6 which has parallel ground, hardened and, if necessary, surface-treated surfaces. After placing the rotary disc 6 on the axle bolt 5, the front plate 1 and the rear plate 2 are placed with their inner surfaces on the surfaces of the rotary disc 6 and are braced together by tightening the clamping nuts 4 by means of the clamping bolts 3 in such a way that the melt duct 11 is completely sealed relative to the outside, on the one hand, and the rotatability of the rotary disc 6 is maintained, on the other hand, wherein the force for adjusting the rotary disc 6 is applied by the pinion which was mentioned above but is not illustrated and which engages the toothed rim 7; or the forces applied by means of a ratchet and an adjusting lever, or by means of a hydraulic system. The clamping forces for bracing the front plate 1 against the rear plate 2 can be corrected by means of the clamping nuts 4, wherein the external clamping forces are to be adjusted to the pressure prevailing in the valve in such a way that the pressing force required for the sealing action is always available.

In dependence on the sequence of cycles of operation of the valve, it might be advantageous to subject the rotary disc 6 after a certain or predetermined time to a timed forward and backward movement in order to prevent any possible deposits of polymer melt on the sealing surfaces.

Figure 4:
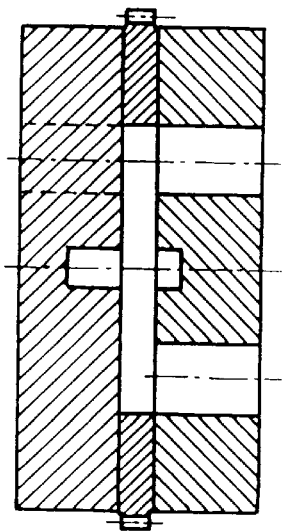
FIG. 4 is a special sectional view of the valve of FIG. 3.

The actual switching procedure is carried out as follows: In the position illustrated in FIG. 1, the rotary disc 6 is adjusted in such a way that its melt duct 11 extends from the inlet opening 8 to the outlet opening 9, so that the polymer passing through the rotary disc is conducted through the first outlet 9. When the rotary disc 6 is adjusted in the direction of arrow 12, the rotary disc 6 rotates in a clockwise direction and its rearward end moves away from the outlet opening 9 and moves towards the inlet opening 9, while its forward end is moved past the inlet opening 8 and reaches the outlet opening 10 of the second outlet, as illustrated in FIGS. 2 and 4 of the drawing. This concludes the switching of the valve; the only space which was filled by polymer melt is now still filled by polymer melt, wherein this melt is not stagnant and aging melt, but is melt which always flows from the inlet opening and through the melt duct 11, so that the object of the present invention is met, i.e., aging and, thus, decomposed melt residues are avoided.

The present invention is not limited to simple three-way valves which only act as change-over switches. Thus, the next embodiment is directed to a three-way valve equipped with two rotary discs, wherein this valve includes an inlet opening and two outlet openings, and wherein melt is conducted to the first outlet opening in a first position, melt is fed to the second outlet opening in a second position, and the flow of melt is distributed to both outlet openings in a third position. Such a three-way valve can be used, for example, for dividing a flow of melt, for removing samples, for a targeted controlled discharge of melt, for example, for granulation, for exchange filters or the like.

Figure 5:
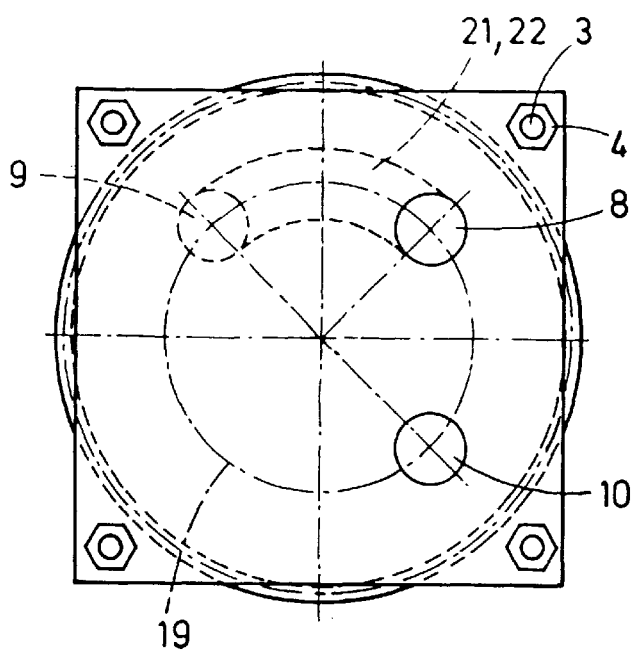
FIG. 5 is an elevational view of a second embodiment of the three-way valve equipped with two parallel rotary discs, shown in an initial position of the rotary discs.
Figure 6:
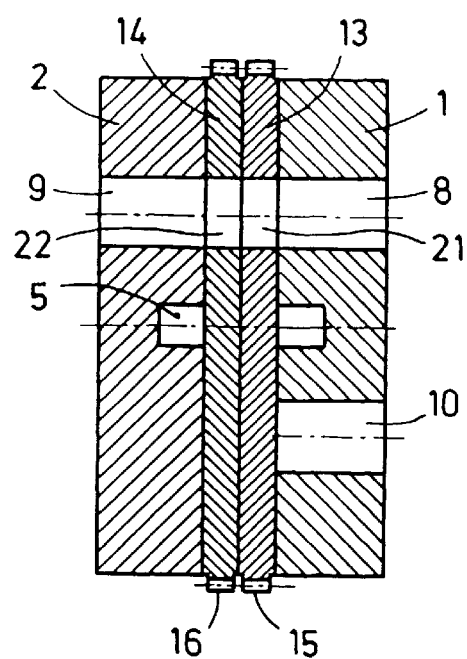
FIG. 6 is a special sectional view of the valve of FIG. 5.
Figure 8:
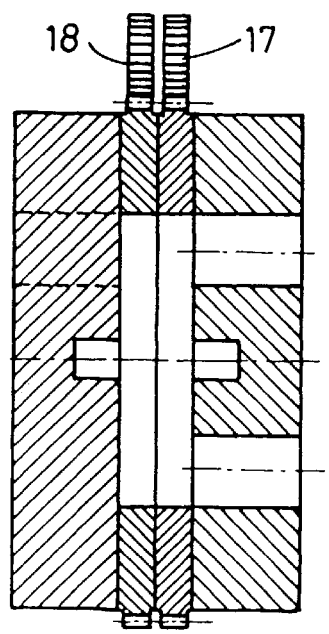
FIG. 8 is a special sectional view of the valve of FIG. 7.

This embodiment will now be described in detail with the aid of FIGS. 5 and 6. FIG. 5 shows a view of the three-way valve corresponding to FIG. 1, with a front plate 1 which is braced by means of clamping bolts 3 and clamping nuts 4 against the rear plate 2, shown in FIG. 6. The rear plate 2 is equipped with an axle bolt 5 which extends through the bores of two rotary discs 13 and 14. For adjusting the rotary discs 13 and 14, the discs are surrounded by toothed rims 15 and 16, wherein spur wheels 17 and 18 engage in these toothed rims for adjusting the rotary discs 13 and 14, as seen in FIG. 8.

Figure 7:
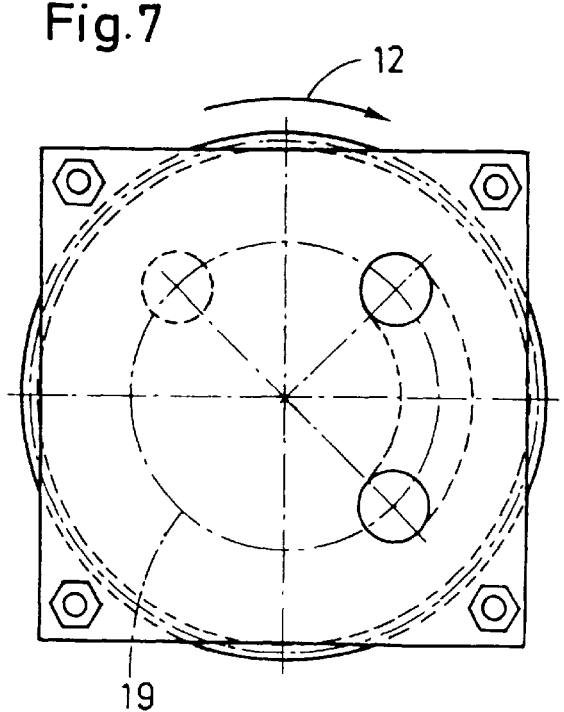
FIG. 7 is an elevational view of the second embodiment of the valve of FIG. 5, shown with the rotary discs in a different position.

The valve housing composed of front plate 1 and rear plate 2 is provided with an inlet opening 8 and two outlet openings 9 and 10. As can be seen especially in the views of FIGS. 5, 7 and 9, the inlet opening 8 and the outlet openings 9 and 10 are arranged on a common reference circle 19 in such a way that the outlet openings 9 and 10 are located by the same angle away from, but on different sides of, the radius intersecting the inlet opening 8. The melt ducts 21 and 22 of the rotary discs 13 and 14 have the same width as the diameters of the connecting bores. The melt ducts extend from one connecting bore to the next connecting bore, wherein the semicircles at the end of the melt ducts correspond to the spaces defined by the connecting bores. This makes it possible that the ducts are utilized fully by the respective flow of melt without forming dead spaces.

As already explained in connection with the first embodiment, the inner surfaces of the front plate 1 and of the rear plate 2 are exactly ground, hardened and, if necessary, further surface-treated. The same is true for the surfaces of the rotary discs 13 and 14 which are ground exactly parallel. After uniformly tightening the clamping nuts 4, the front plate 1 and the rear plate 2 are braced against the surfaces of the rotary discs 13, 14 in such a way that a housing is provided which is sealed even in the case of high internal pressures, while the rotary discs can still be moved.

The elevational view of FIG. 5 shows the inlet opening 8 of the front plate 1 and the second outlet opening 10 of the front plate 1. The rear plate 2 is provided with the first outlet opening 9. The rotary discs 13 and 14 are adjusted in such a way that their ducts 21 and 22 extend parallel to each other and from the inlet opening 8 to the first outlet opening 9. This provides a connection between the inlet opening 8 and the outlet opening 9 through the ducts 21, 22, wherein the polymer melt fully flows through this connection and the connection contains no dead spaces, so that no residues are possible.

In order to switch the valve to the second outlet 10, the two rotary discs 13 and 14 are rotated in the direction of arrow 12. As a result, the ducts 21 and 22 are moved away from the first outlet opening 9 and now bridge the inlet opening 8 and the second outlet opening 10. This once again results in a flow of melt without dead spaces which could hold back portions of the melt which could be thermally decomposed. FIG. 8 of the drawing shows the corresponding cross-sectional view which extends once again in the area of the ducts 21 and 22 along the reference circle 19 of the connections. FIG. 8 further shows spur gear wheels 17 and 18 which engage in the toothed rims 15 and 16 for driving the rotary discs 13 and 14.

Figure 9:
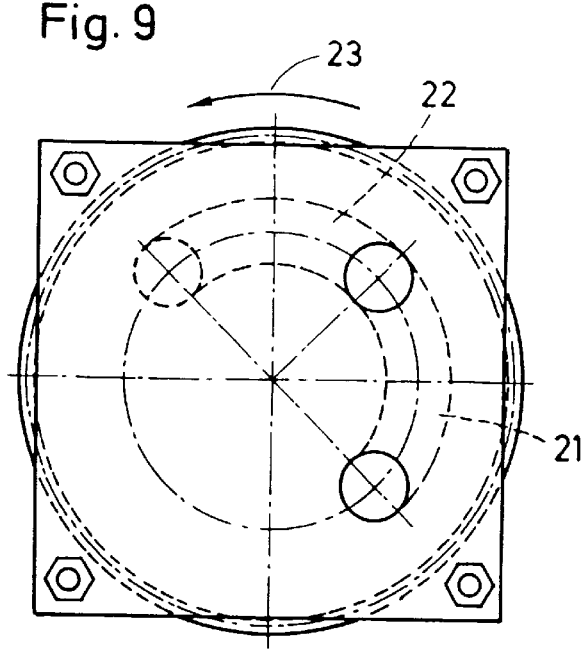
FIG. 9 is an elevational view of the second embodiment of the three-way valve of FIG. 5, shown with the rotary discs in yet another position.
Figure 10:
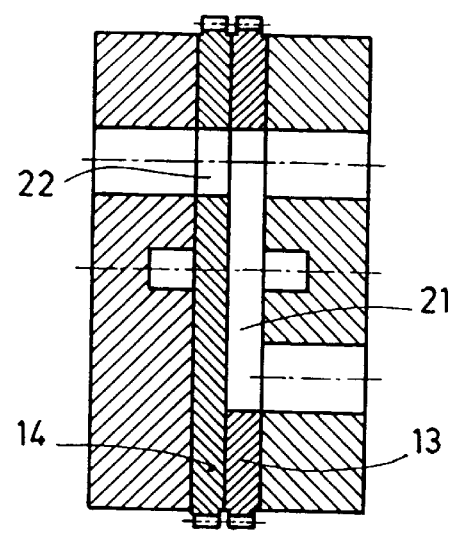
FIG. 10 is a special sectional view of the valve of FIG. 9.

The third position of switching the three-way valve of FIG. 5 is explained in FIGS. 9 and 10. The rotary disc 14 remains in its position already illustrated in FIGS. 5 and 6 and its duct 22 provides a first connection between the inlet opening 8 and the first outlet opening 9. The rotary disc 13, on the other hand, is moved in the direction of arrow 23, so that its duct 21 provides a connection between the inlet opening 8 and the second outlet opening 10. As a result, the flow of melt is conducted to both outlet openings, so that the flow of melt is divided within the three-way valve from one inlet to two outlets.

Figure 15:
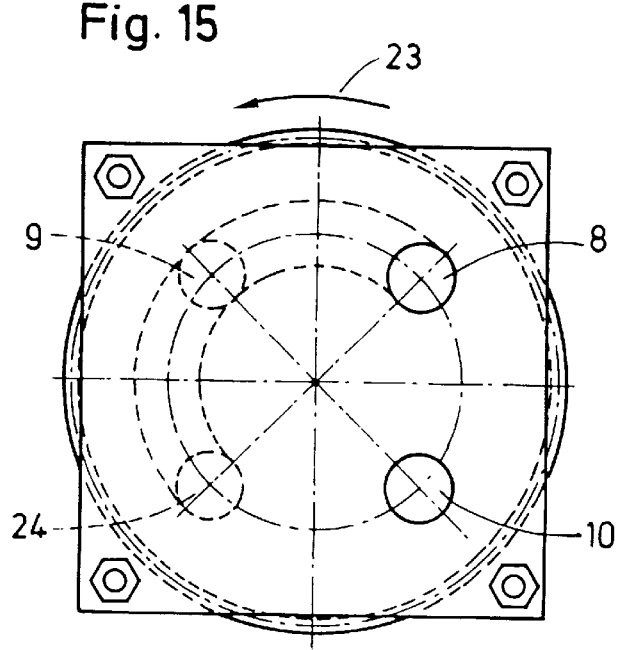
FIG. 15 is an elevational view of the third embodiment of the multipath valve of FIG. 11, shown after another change of the positions of the rotary discs.
Figure 16:
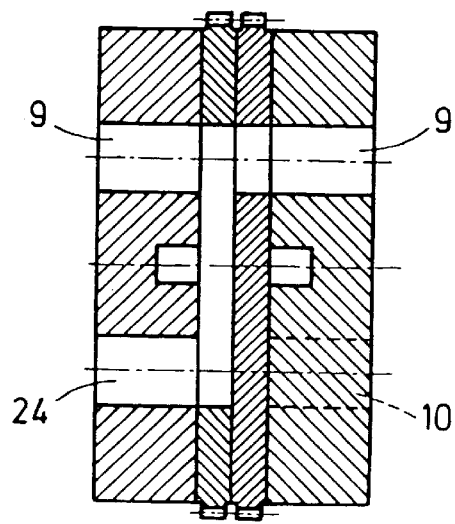
FIG. 16 is a special sectional view of the valve of FIG. 15.

Additional possibilities can be effected in a third embodiment which once again is a multipath valve with two rotary discs. In this case, two inlet openings and two outlet openings are provided, wherein, in a first switching position, the first inlet opening 8 is connected to the first outlet opening 9 and separately the second inlet opening 24 is connected to the second outlet opening 10, so that two switched melt paths are created. In the second switching position of FIGS. 13 and 14, the second melt inlet 24 is closed, and the first inlet opening 8 is connected to both outlet openings 9 and 10 for dividing the flow of melt. In another switching position of FIGS. 15 and 16, both inlet openings 8 and 20 are connected to the first outlet opening 9 for mixing two flows of melt. Fields of application are, for example, a sequential connection of two otherwise separate circulations of melt, the possibility of intersecting flows of melt, and merging two flows of melt.

Figure 11:
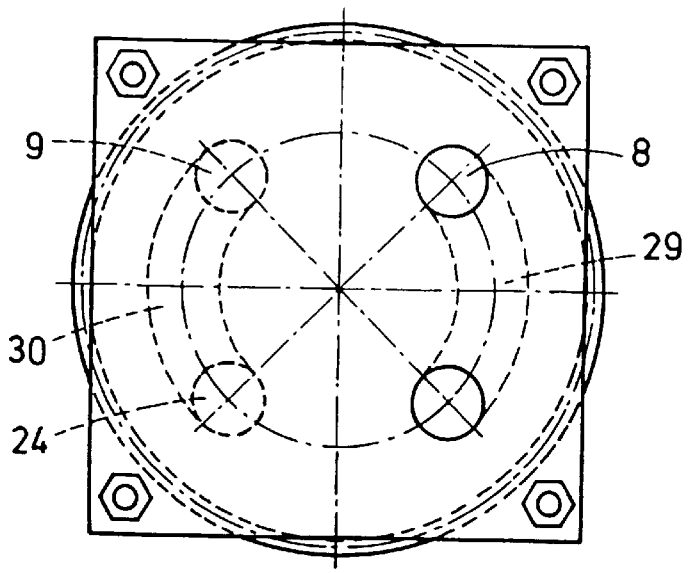
FIG. 11 is an elevational view of a third embodiment of the multipath valve according to the present invention provided with two inlets and two outlets and two rotary discs, shown in a first switching position.
Figure 12:
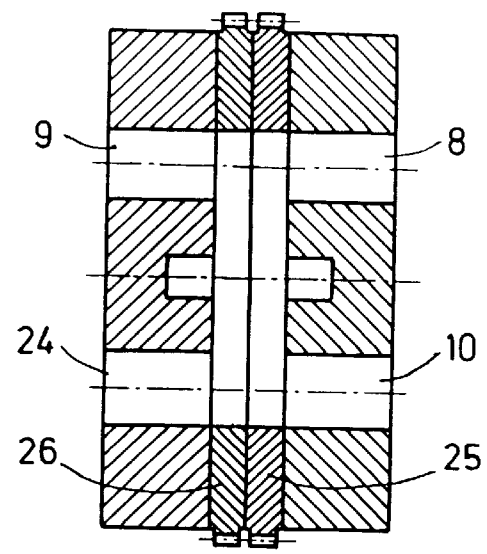
FIG. 12 is a special sectional view of the valve of FIG. 11.

Also in this embodiment, a front plate 1 and a rear plate 2 shown in FIGS. 11 and 12 are tightly braced together against two rotary discs 25, 26 in such a way that the rotary discs can still be rotated by means of a drive unit which acts on the toothed rims 27, 28 of the discs. As is the case in all other embodiments, there is also the possibility of adjusting the bracing force between the front and rear plates in accordance with a measurement or an indication; however, it is also possible to limit the rotation of the rotary discs by means of stops, so that end points of the movements of the discs are provided.

As can be seen in the front view of FIG. 11 and the special sectional view of FIG. 12, the front plate 1 is equipped with a first inlet opening 8 and a first outlet opening 10, while the rear plate 2 has a second inlet opening 24 and a second outlet opening 9.

FIGS. 11 and 12 further show that, in a first position of the multipath valve, the connection openings 8 and 10 of the front plate 1 are connected through the duct 29 of the rotary disc 25, while simultaneously the duct 30 of the rotary disc 26 connects the two connection openings 9 and 24 of the rear plate 2. Since the ducts have the same width as the connection openings, the length of the ducts corresponds to the distance between the connection bores, and the end portions of the ducts are adapted to the inside cross-section of the connection bores, no dead spaces are formed and there is no danger that decomposing melt residues are formed.

Figure 13:
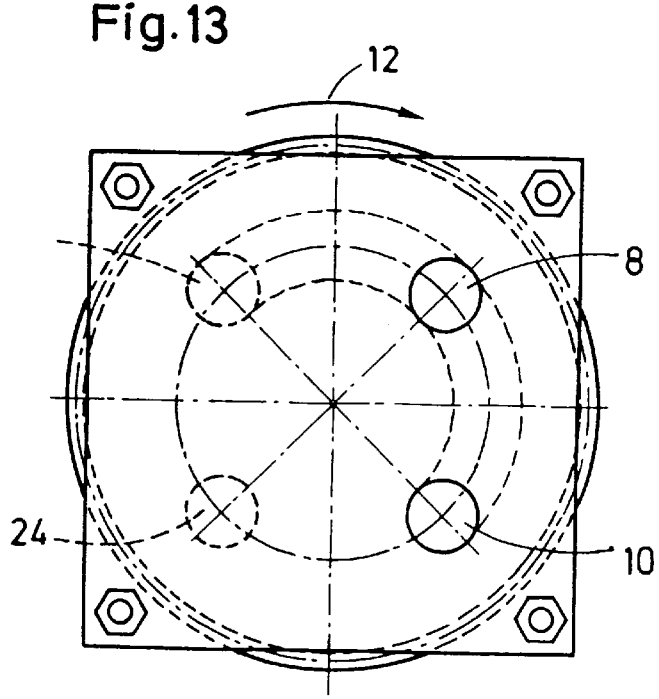
FIG. 13 is an elevational view of the third embodiment of the multipath valve of FIG. 11 shown with the rotary discs in different positions.
Figure 14:
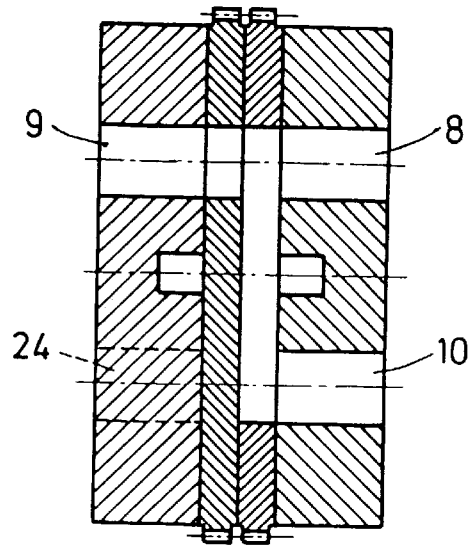
FIG. 14 is a special sectional view of the valve of FIG. 13.

FIGS. 13 and 14 show the same multipath valve after a first switching. The rotary disc 25 has remained in its original position, while the rotary disc 26 has been rotated in a clockwise direction in the direction of arrow 12 by a distance corresponding to the angle between the connection bores. Consequently, the duct 29 connects the inlet opening 8 to the outlet opening 10; however, in addition, the duct 30 of the rotary disc 26 forms a connection between the outlet opening 9 and the inlet opening 24. For switching the valve further, the two rotary discs 25 and 26 are moved relative to the position of FIG. 13 by the distance corresponding to the angle between the connection openings in the direction of arrow 23 and, thus, the first inlet opening 8 as well as the second inlet opening 24 are connected to the outlet opening 9, i.e., the melt is conducted to both inlet openings and is mixed in the multipath valve according to FIGS. 15 and 16 and is discharged only through a single outlet 9. Also in this case, the ducts 29 and 30 are always filled with melt flow so that there are no possibilities that melt residues are stored, aged and decomposed.

Figure 17:
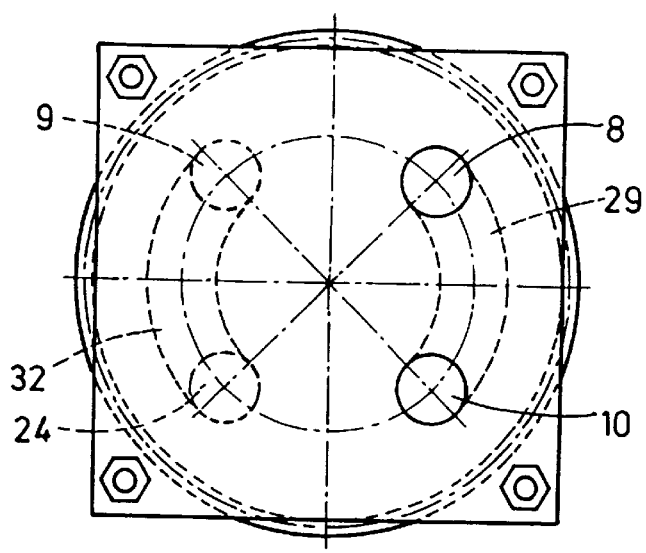
FIG. 17 is an elevational view of a fourth embodiment of the valve with two inlets and two outlets and two rotary discs, shown in the open position.
Figure 18:
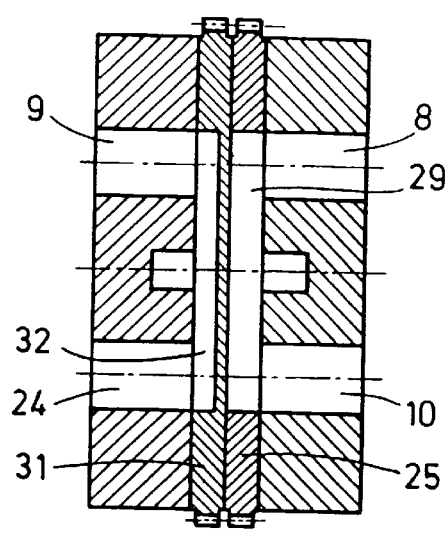
FIG. 18 is a special sectional view of the valve of FIG. 17.

FIGS. 17 and 18 show a valve with inlet openings 8 and 24 and outlet openings 9 and 10. The valve has rotary discs 25 and 31, wherein the rotary disc 25 is provided with the duct 29 and the rotary disc 31 is provided with the duct 32. The duct 29 extends completely through the rotary disc 25, while the duct 32 only partially penetrates the rotary disc 21 in the form of a blind-end groove. Consequently, it is only possible to effect connections between the inlet 24 and the outlet 9, on the one hand, and between the inlet 8 and the outlet 10, on the other hand. Accordingly, the rotary discs 25 and 31 can only be used for opening and closing.

The invention is not limited by the embodiments described above which are presented as examples only but can be modified in various ways within the scope of protection defined by the appended patent claims.

We claim:

1. A multipath valve for distributing and/or dividing at least one flow of polymer melt during production and processing thereof, wherein melt flows through all internal chambers of the valve during all conditions of operation, the multipath valve comprising a front plate and a rear plate with surfaces facing each other, wherein the surfaces are ground and hardened, and wherein the front plate and the rear plate are provided with openings for inlets and outlets of the polymer melt, and at least one rotary disc rotatably mounted on an axle bolt between the front plate and the rear plate, the at least one rotary disc having parallel ground and hardened surfaces, wherein the rotary disc has circular segment-shaped ducts having a width and end radii equal to an inner width of the openings of the front plate and the rear plate, wherein center points of the openings are located on a reference circle and center lines of the ducts are located on the reference circle, wherein the at least one rotary disc is configured to be positionable in accordance with a desired flow path of the polymer melt, further comprising clamping bolts and clamping nuts for bracing the front plate and the rear plate against the at least one rotary disc such that the ducts are completely sealed, while the at least one rotary disc remains rotatable.

2. The valve according to claim 1, wherein the surfaces of the front plate, of the rear plate and of the at least one rotary disc are surface-treated.

3. The valve according to claim 1, comprising two rotary discs.

4. The valve according to claim 1, comprising stops for limiting the rotational movement of the at least one rotary disc.

5. The valve according to claim 1, wherein the at least one rotary disc has an outer toothed rim, further comprising a drive means engaging in the toothed rim for driving the at least one rotary disc.

6. The valve according to claim 1, wherein the at least one rotary disc has outer drive pawls, further comprising a drive means engaging in the drive pawls for driving the at least one rotary disc.

7. The valve according to claim 1, wherein the front plate and the rear plate have two inlet openings and two outlet openings.

8. The valve according to claim 6, wherein the drive means comprises a ratchet for driving the at least one rotary disc.

9. The valve according to claim 6, wherein the drive means comprises a lever for driving the at least one rotary disc.

10. A method of operating multipath valve for distributing and/or dividing at least one flow of polymer melt, the multipath valve comprising a front plate and a rear plate with surfaces facing each other, wherein the surfaces are ground and hardened, and wherein the front plate and the rear plate are provided with openings for inlets and outlets of the polymer melt, and at least one rotary disc rotatably mounted on an axle bolt between the front plate and the rear plate, the at least one rotary disc having parallel ground and hardened surfaces, wherein the rotary disc has circular segment-shaped ducts having a width and end radii equal to an inner width of the openings of the front plate and the rear plate, wherein center points of the openings are located on a reference circle and center lines of the ducts are located on the reference circle, wherein the at least one rotary disc is configured to be positionable in accordance with a desired flow path of the polymer melt, further comprising clamping bolts and clamping nuts for bracing the front plate and the rear plate against the at least one rotary disc such that the ducts are completely sealed, while the at least one rotary disc remains rotatable, the method comprising automatically carrying out at least slight forward and rearward movements of the at least one rotary disc in a timed sequence, such that any danger of carbonated deposits of melt on the surfaces is eliminated.

* * * * *